UNITED STATES PATENT OFFICE.

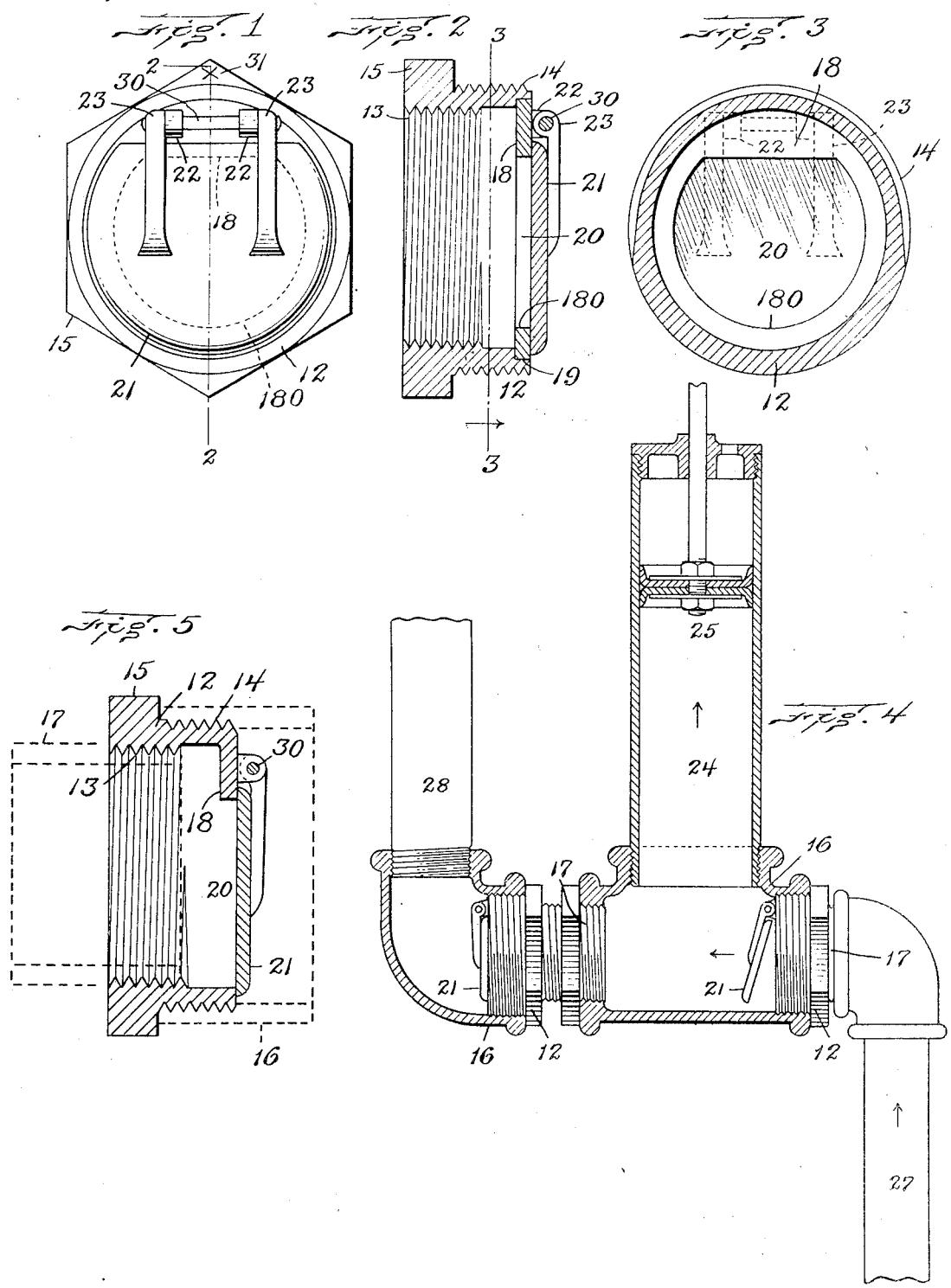

WILLIAM S. JACOBS, OF MALDEN, MASSACHUSETTS, ASSIGNOR OF ONE-HALF TO CHARLES C. CLAPP, OF MALDEN, MASSACHUSETTS.

COMBINED REDUCING-BUSHING AND CHECK-VALVE.

941,713.        Specification of Letters Patent.     Patented Nov. 30, 1909.

Application filed January 28, 1909. Serial No. 474,774.

*To all whom it may concern:*

Be it known that I, WILLIAM S. JACOBS, of Malden, in the county of Middlesex and State of Massachusetts, have invented certain new and useful Improvements in Combined Reducing-Bushings and Check-Valves, of which the following is a specification.

This invention relates to a so-called reducing bushing comprising an annular body having screw-threaded portions of different diameters, said threads being adapted to engage corresponding threads on pipe or conduit sections, so that the bushing is adapted to connect two conduit sections of different diameters, the bushing being provided with an external surface of hexagonal or other form, adapted to engage a wrench.

The invention has for its object to enable a reducing bushing of this character to be utilized not only for connecting two conduit sections, but also as a check valve.

To this end, the invention consists in a reducing bushing having the usual characteristics above enumerated, and having in addition an inwardly projecting flange at one end located within the diameter of the external thread, and forming a hinge support and a part of a valve seat, a rigid hinge member on said flange, and a clapper valve pivoted to said member and adapted to be seated on a portion of said flange, the bushing being provided with a seat for said valve formed in part by the flange and surrounding the passage through the bushing.

Of the accompanying drawings, forming a part of this specification,—Figure 1 represents an end view of a reducing bushing embodying my invention. Fig. 2 represents a section on line 2—2 of Fig. 1. Fig. 3 represents a section on line 3—3 of Fig. 2. Fig. 4 represents a sectional view of a force pump comprising in its construction two of the bushings embodying my invention. Fig. 5 represents a sectional view of a modification.

The same reference characters indicate the same parts in all the figures.

In the drawings,—12 represents a reducing bushing having at one end an internal screw thread 13, and at its opposite end an external screw thread 14 of larger diameter than the internal thread. The bushing is also provided with an enlargement 15 having an external surface adapted to engage a wrench, said surface being preferably of hexagonal or other polygonal form.

The bushing above described is a well known article of manufacture, and is used for connecting two conduit sections 16 and 17 of different diameters, the section 16 being internally threaded to engage the external thread 14, while the section 17 is externally threaded to engage the internal thread 13.

In carrying out my invention, I provide the bushing at the end opposite the enlargement 15 with an inwardly projecting flange 18 which may be cast or otherwise formed as an integral part of the bushing, or as I prefer, said flange may be made in a separate piece having a segmental extension 180, the flange and extension being fitted in a recess or rabbet 19 formed in one end of the bushing, and rigidly secured in said recess in any suitable way. The flange 18 and extension surround an opening 20 which is preferably of about the same cross sectional area as the smaller conduit section 17. The outer side of the flange 18 and its extension 180 constitute a flat valve seat substantially at right angles with the axis of the bushing.

21 represents a clapper valve which is hinged to the flange 18 and is formed to close upon the valve seat and form a tight joint. In this embodiment of the invention, the flange is shown provided with ears 22 forming a fixed hinged member, and the valve with ears 23 connected by a pintle or pin 30 with the ears 22, arranged within the plane of the outer surface of the valve, and in close proximity to the flange 18, as shown in Fig. 2.

It will be seen from the foregoing that my invention provides a reducing bushing adapted to connect two conduit sections of different diameters, and also to serve as a check valve, the entire bushing, including the check valve, occupying practically no more space than is required for the bushing alone, and the device as a whole reducing to the minimum the expense required for the application of a check valve to a conduit.

The flange 18 and its extension 80 constitute an apertured face plate, the outer side of which constitutes a valve seat, the flange 18 not only constituting a hinge support but also a part of the valve seat. The flange 18 and the valve seat may be integral with the bushing if desired, as shown in Fig. 5, the outer side of the flange being flush with the end of the bushing and forming a part of the valve seat, the segmental portion of the end of the bushing, which extends from one end portion of the flange to the other, completing the valve seat. Said seat is formed in either case to conform to a disk valve which is cut away at one side to afford room for the hinge that connects it with the bushing, the valve and hinge being within the diameter of the end of the bushing to which the valve is applied, and therefore adapted to be contained in the conduit section 16, so that the operation of connecting two conduit sections by the bushing also locates a check valve within the conduit.

The bushing is preferably provided with an indicating mark 31 adjacent to the valve hinge, said mark enabling a workman to properly locate the hinge in the conduit.

In Fig. 4 I have shown the application of my improved reducing bushing and check valve to a force pump, which comprises a pump cylinder 24 in which a piston 25 reciprocates, a T-shaped fitting 16 attached to one end of the cylinder, an inlet pipe 27 connected with one end of the fitting 16 by an elbow-shaped conduit section 17 and by one of the bushings 12, and an outlet pipe 28 connected with the opposite end of said fitting 16, by another bushing 12, and by an intermediate bushing constituting another conduit section 17.

It is obvious that the bushings 12 may be arranged so that the valve seats are substantially horizontal instead of being substantially vertical. It will be seen that in either case the bushing is adapted to be engaged with an elbow, the end of the bushing containing the check valve being insertible in the elbow, and the valve being adapted to open and close in the elbow in consequence of the fact that the hinge supporting flange on the bushing forms a part of the seat for the check valve, so that no extension of the body of the check valve from said hinge is required to provide a valve seat. In other words, the flange having its outer sire flush with the end of the bushing and forming a part of the valve seat enables the bushing to serve as a valve carrier and seat without being elongated beyond the length required for the purpose of connecting the two conduit sections.

I claim:

1. As an article of manufacture, a reducing bushing having larger and smaller concentric screw-threaded portions, an external enlargement formed to engage a wrench, an inwardly projecting flange located within the diameter of the larger threaded portion and forming a hinge support and a part of a valve-seat and a clapper valve formed as a disk cut away at one side and connected with the flange by a hinge located between the cut-away portion of the valve and the periphery of the bushing and supported by the flange, the bushing being provided with a valve seat, a part of which is formed by the outer side of the flange, said seat surrounding the passage through the bushing.

2. As an article of manufacture, a reducing bushing having larger and smaller concentric screw-threaded portions, an external enlargement formed to engage a wrench, an annular face plate fitted in an annular recess formed in the end of the larger screw-threaded portion and composed of a flange portion 18 and an extension 18, and a clapper valve formed as a disk cut away at one side and connected with the said flange portion by a hinge located between the cut-away portion of the valve and the periphery of the bushing and supported by the flange portion, the outer side of said face plate forming a valve seat which surrounds the passage through the bushing.

In testimony whereof I have affixed my signature, in presence of two witnesses.

WILLIAM S. JACOBS.

Witnesses:
C. F. BROWN,
P. W. PEZZETTI.